(12) United States Patent
Meacham

(10) Patent No.: US 10,167,776 B2
(45) Date of Patent: Jan. 1, 2019

(54) VARIABLE COMPRESSION CONNECTING ROD

(71) Applicant: G. B. Kirby Meacham, Shaker Heights, OH (US)

(72) Inventor: G. B. Kirby Meacham, Shaker Heights, OH (US)

(*) Notice: Subject to any disclaimer, the term of this patent is extended or adjusted under 35 U.S.C. 154(b) by 237 days.

(21) Appl. No.: 15/530,279

(22) PCT Filed: Jun. 24, 2015

(86) PCT No.: PCT/US2015/037334
§ 371 (c)(1),
(2) Date: Dec. 19, 2016

(87) PCT Pub. No.: WO2015/200432
PCT Pub. Date: Dec. 30, 2015

(65) Prior Publication Data
US 2017/0159559 A1 Jun. 8, 2017

Related U.S. Application Data

(60) Provisional application No. 62/018,059, filed on Jun. 27, 2014.

(51) Int. Cl.
*F02B 75/32* (2006.01)
*F02B 75/04* (2006.01)
*F02D 15/02* (2006.01)
*F16C 7/06* (2006.01)
(Continued)

(52) U.S. Cl.
CPC ............ *F02B 75/045* (2013.01); *F02D 15/02* (2013.01); *F16C 3/28* (2013.01); *F16C 7/06* (2013.01); *F16D 41/16* (2013.01); *F16C 2360/22* (2013.01)

(58) Field of Classification Search
CPC .......... F02B 75/045; F02D 15/02; F16C 7/06; F16D 41/16
See application file for complete search history.

(56) References Cited

U.S. PATENT DOCUMENTS

| 4,864,975 A | 9/1989 | Hasegawa |
| 6,557,457 B1* | 5/2003 | Hart ......................... F16C 9/04 |
| | | 92/223 |
| 6,752,105 B2 | 6/2004 | Gray, Jr. |
| (Continued) | | |

FOREIGN PATENT DOCUMENTS

RU 2296234 C1 * 3/2007

*Primary Examiner* — Joshua T Kennedy

(57) ABSTRACT

The present invention is directed to improved designs and methods for improving engine fuel efficiency by providing two-stage engine variable compression in running engines using connecting rod force reversals to rotate eccentric bushings to change the connecting rod length. Compression ratio changes are initiated by shifting a block-mounted cam such that it engages and flips a bi-stable toggle on the connecting rod. The clutch mechanism latches the eccentric at the eccentric rotation end point, whereupon the connecting rod acts as a rigid rod. The invention includes novel configurations of the lubricated journal bearing between the connecting rod and the eccentric that modify the squeeze film bearing effects and resulting friction. These configurations reduce the peak eccentric torque carried by the clutch mechanism while facilitating eccentric rotation at lower torque.

8 Claims, 12 Drawing Sheets

(51) Int. Cl.
*F16D 41/16* (2006.01)
*F16C 3/28* (2006.01)

(56) References Cited

U.S. PATENT DOCUMENTS

| | | | | |
|---|---|---|---|---|
| 7,685,974 B2* | 3/2010 | Berger | ............... | F02B 75/045 |
| | | | | 123/48 B |
| 8,434,435 B2* | 5/2013 | Engineer | ............... | F02B 75/045 |
| | | | | 123/48 A |
| 9,212,622 B2* | 12/2015 | Kosheleff | ............. | F02F 3/0069 |
| 2013/0074799 A1* | 3/2013 | Kosheleff | ............... | F16C 7/023 |
| | | | | 123/197.3 |
| 2018/0258846 A1* | 9/2018 | Kamo | ................... | F02B 75/045 |
| 2018/0266314 A1* | 9/2018 | Ezaki | ................... | F02B 75/045 |

* cited by examiner

VARIABLE COMPRESSION CONNECTING ROD

FIELD OF THE INVENTION

The present invention is directed to improving engine fuel efficiency by providing adjustable length internal combustion engine connecting rods that link the engine crankshaft to the pistons, wherein the rod length may be changed in a running engine to raise or lower the compression ratio as a function of engine operating conditions. More specifically, the invention is directed to two-stage adjustable length connecting rods in which the adjustable element is an eccentric connection of the rod end to the piston wrist pin that is actuated by the periodically reversing gas and inertial dynamic forces acting on the rod and eccentric assembly, and latched in either of two positions resulting in two different effective rod lengths and corresponding compression ratios.

BACKGROUND OF THE INVENTION

The present invention comprises improvements to generally known two-stage adjustable length connecting rods in which the adjustable element is an eccentric connection of the rod end to the piston pin that is actuated by the periodically reversing gas and inertial dynamic forces acting on the rod and eccentric assembly, and latched in either of two positions resulting in two different effective rod lengths and corresponding compression ratios. U.S. Pat. No. 7,685,974 issued to Berger provides extensive background information including prior art, utility of two-stage variable compression ratio for improved engine efficiency, and nature of the periodic gas and inertial dynamic forces operating on the rod and eccentric assembly. '974 is incorporated by reference, and a brief summary follows. The discussion is directed to spark ignition throttle controlled internal combustion engines typically used in light duty vehicles, although it is obvious that the invention is applicable to compression ignition engines and other reciprocating machines such as compressors.

Internal combustion engine compression ratio is defined as the volume between the piston and the cylinder head at bottom dead center divided by the volume at top dead center. In typical prior art engines the compression ratio is fixed by the engine design and is not an adjustable operating variable. In high compression engines the volume at top dead center is relatively small, and the compressed fuel-air mixture is at a higher temperature and pressure than in low compression engines at the moment of ignition. Increasing temperature and pressure increase the engine thermodynamic efficiency by increasing the combustion pressure that drives the piston toward bottom dead center on the power stroke, thereby producing more useful work from a given quantity of fuel. The temperature and pressure must, however, remain below the knock-limit. Below the knock limit, the fuel-air mixture combusts as a progressive flame front passing through the combustion chamber volume, and results in a smooth pressure rise to drive the piston. Above the knock limit, a portion of the fuel-air mixture in the combustion chamber undergoes very rapid bulk combustion that produces a pressure spike resulting in audible noise and potential engine damage. The knock-limit is affected by a number of variables other than compression ratio including fuel chemical composition, inlet manifold pressure, engine temperature, and ignition timing relative to piston position. Modern engines typically have knock sensors that detect incipient knock. These allow the engine control module to automatically make adjustments, e.g. varying ignition timing, to keep the engine operating at the highest possible efficiency without knock over the full engine load and speed range, while compensating for other variables such as fuel chemistry and engine temperature. Late or retarded ignition timing from the maximum torque value reduces knock, but also reduces engine efficiency and increases heat transfer losses.

The fixed compression ratio of prior art engines is a compromise that balances maximum output torque against light load efficiency. Maximum output torque at a given speed occurs when the throttle is fully open, thereby providing the maximum gas pressure in the inlet system. This gas may be a fuel-air mixture in manifold or port injection systems, or air alone in direct cylinder injection systems in which fuel is added to the air in the cylinder. In a naturally aspirated engine this pressure is slightly below atmospheric pressure because of flow losses, and in a turbocharger or supercharger pressure boosted engine it is above atmospheric pressure. The cylinder at the beginning of the compression stroke is filled with a charge of gas slightly below the inlet manifold pressure, since inlet system flow losses prevent complete pressure equilibration between the inlet system and the cylinder. The compression ratio is chosen so that at the end of the compression stroke the gas charge is at a temperature and pressure that results in maximum output torque with optimized ignition timing and without knock. A pressure boosted engine generally requires a lower compression ratio to avoid knock at maximum torque since the initial gas pressure and charge mass is higher. At light load the throttle reduces the inlet system pressure and the initial cylinder pressure resulting in a smaller charge mass. This leads to lower than optimum gas charge temperature and pressure at the end of the compression stroke, and consequent reduced efficiency. Since the typical duty cycle of light duty vehicles consists of predominantly light load operation, the non-optimum compression ratio results in significant efficiency losses.

It is generally known that that a capability to adjust compression ratio in a running engine as a function of operating conditions has potential to improve both light load efficiency and maximum output torque compared to a fixed compression ratio. High compression at light loads compresses the low mass light load gas charge into a reduced combustion chamber volume. This increases the gas charge temperature and pressure at the end of the compression stroke to a more optimum level and increases the thermodynamic efficiency. Reduced compression at maximum output torque compresses the maximum load gas charge into an increased combustion chamber volume. This allows a larger charge mass without exceeding the optimum temperature and pressure at the end of the compression stroke, allowing higher output torque. This is a particular advantage in pressure boosted engines since it permits a smaller displacement engine to provide the required maximum output torque, offering potential engine size and weight savings.

Various approaches to adjusting the compression ratio are known, and are summarized in '974. Two-stage adjustable length connecting rods are the subject of '974 and a number of other patents, and are attractive because they require minimum changes to the engine and add little overall size or weight. This approach employs two-stage adjustment in which the rod may be switched between two fixed lengths, since it is simpler than continuous adjustment and provides nearly the same benefit. As in a conventional fixed compression ratio engine, the crankshaft axis is fixed relative to the cylinder head. An increase in connecting rod length reduces the volume at top dead center and increases the compression ratio, while a decrease in length increases the volume at top dead center and reduces the compression ratio. Many mechanisms are disclosed in the prior art to carry out the adjustment, and a number use an eccentric bushing between the piston wristpin and the small end of the connecting rod that is rotated relative to the connecting rod in a journal bearing to adjust the effective connecting rod length. Although there are exceptions, typical prior art mechanisms are self-powered in that the alternating compressive and tensile forces on the connecting rod and eccentric bushing during the engine cycle generate torque that rotates the eccentric to change the effective rod length. Mechanical stops are incorporated to limit the eccentric bushing rotation to a specific angle. A bi-stable mechanical latch mounted on the moving connecting rod locks the eccentric into either the high compression or the low compression position, and is reset by a stationary trigger mechanism that interacts with the latch on the moving connecting rod to change the compression ratio. When the latch is reset it is biased to disengage the eccentric, and then engage it again after the alternating rod forces rotate the eccentric to the new selected position. The latch typically disengages only under low load as the alternating rod load reverses, and the eccentric will only move toward the new selected position when the alternating rod load is in the correct direction. Compressive rod force is required to rotate the eccentric within the journal bearing to reduce the effective rod length, and tensile rod force is required to rotate the eccentric in the opposite direction to increase the effective rod length. The latch reengages the eccentric only when the eccentric reaches the new position. One or more engine revolutions after latch reset are required to obtain the connecting rod force variations needed to release the latch and rotate the eccentric to the new position so that the latch may reengage.

Three principal approaches are proposed in the prior art to allow a stationary trigger mechanism to reset the latch on the moving connecting rod to change the compression ratio: hydrostatic fluid interaction, hydrodynamic fluid interaction, and mechanical cam interaction. Hydrostatic fluid interaction employs passages in the engine block, crankshaft and connecting rod such that controllable oil pressure may be transmitted from a stationary source through the rotating interfaces to a hydraulic plunger that shifts the latch mechanism between positions on the moving connecting rod. Hydrodynamic fluid interaction employs stationary oil nozzles mounted to the engine block that direct momentary oil jets to exert forces on control surfaces carried by the moving connecting rod that move to shift the latch between positions. Mechanical cam interaction employs cam surfaces mounted to the engine block that may be controllably shifted to contact and shift the latch between positions on the moving connecting rod. Hybrid approaches, e.g. mechanical cam surfaces that shift valves in the connecting rod that redirect pressurized oil to hydrostatically shift the latches between positions, are also known.

The two-stage adjustable length connecting rods of '974 and related prior art have an inherent indeterminacy related to the fact that alternating compressive and tensile forces on the connecting rod and eccentric bushing during the engine cycle are used to rotate the eccentric to change the effective rod length. Ideally, one or two engine revolutions after latch reset are required to obtain the connecting rod force variations needed to release the latch and rotate the eccentric to the new position so that the latch may reengage. If, however, the eccentric does not rotate enough to reach the new position and engage the latch while the rod force is in the correct direction, the subsequent force reversal will reverse the initial eccentric rotation direction. This causes a loss of the desired rotation, and may result in situations in which the eccentric rotational position cycles with each rod force direction, and full rotation and latch engagement is either slow or never completed. Such unproductive cycling may also cause wear and noise. Since maximum compressive rod forces include compression and power stroke gas loading and are typically much larger than primarily inertial tensile rod forces, it may be more difficult to lengthen the rod and increase the compression ratio.

The relationship between the eccentric geometry and the coefficient of friction in the journal bearing between the eccentric and the connecting rod is critical in achieving reliable eccentric rotation while minimizing stress on the latch. The parameters are shown in FIG. 12:

R is the outside radius of the eccentric 108 which rotates within the journal formed by the small end 109 of the connecting rod body 110;

r is the eccentric offset between the journal center of the piston wrist pin 107 and the center of the outside diameter of the eccentric 108;

$\alpha$ is the rotational angle between a line 1200 perpendicular to the centerline 1201 of the connecting rod body 110;

F is the instantaneous value of the tensile or compressive force on the connecting rod 100;

$\mu$ is the coefficient of friction between the eccentric 108 rotating within the small end 109 of the connecting rod body 110;

$M_f$ is the torque on the eccentric 108 generated by the friction between the eccentric 108 and the small end 109 of the connecting rod body 110; and $M_r$ is the reaction torque on the eccentric 108 generated by the force F acting on the eccentric offset.

$$M_f = F\mu R$$

$$M_r = Fr \cos \alpha$$

If the reaction torque $M_r$ is greater than the friction torque $M_f$ the eccentric will rotate in the direction of the reaction torque, and if it is less it will not rotate. It is useful to define a parameter Z as the ratio of the reaction torque to the friction torque:

$$Z = \frac{M_r}{M_f} = \frac{Fr\cos\alpha}{F\mu R} = \frac{r\cos\alpha}{\mu R}$$

If Z is greater than 1 rotation will take place, and if it is less than 1 it will not. A large Z therefore provides higher assurance of successful rotation between latched positions. A smaller Z however, counteracts a larger portion of the reaction torque with the friction torque and reduces the load on the latch mechanism, while still permitting rotation so long as Z has a value greater than 1. The following example is based on a 75 mm diameter bore and piston:

Maximum axial force F 25,700 N,
Rod length adjustment range 4 mm,
Eccentric offset r 3.5 mm,
Eccentric rotational angle $\alpha$+/−55 degrees,
Eccentric outside radius R 17 mm, and
Friction coefficient $\mu$ 0.05.
Reaction torque, $M_r$=Fr cos $\alpha$=51.6 Nm
Friction torque, $M_f$=F$\mu$R=21.8 Nm
Net rotational torque $M_n$=$M_r$−$M_f$=29.8 Nm $$Z = \frac{M_r}{M_f} = 2.37$$

In this example rotation is possible and the net rotational torque $M_n$ that is carried by the latch is reduced by the frictional torque $M_f$.

Except for the friction coefficient μ, the parameters affecting Z are geometric design parameters. The friction coefficient μ in contrast is only in part a function of the choice of design parameters including the eccentric 108 and rod small end 109 materials, contacting surface finishes, any coatings, and the lubricant formulation. It is also believed to be affected by hydrodynamic effects, particularly transient squeeze film lubrication driven by alternating connecting rod compressive and tensile forces acting on the journal bearing oil film between the connecting rod small end 109 and eccentric bushing 108. While not wishing to be bound by theory, it is believed that squeeze film lubrication is an important component of piston wrist pin lubrication, and is similarly important in determining the instantaneous friction coefficient μ between the eccentric and the rod, and that it is not adequately addressed in the prior art.

I. Elsion et al./*Wear* 261 (2006) 785-791 describes experimental investigation of piston wrist pin lubrication by rotationally oscillating a piston wrist pin within a journal that is clamped from opposite sides by an applied load. They report a mixed lubrication regime friction coefficient μ in the range of 0.03 to 0.06 for a steel pin and an aluminum journal, and show modest effects of experimental coatings and engineered surface finishes. Since the clamping load is constant rather than periodically reversing, these experiments do not provide information on transient squeeze film lubrication effects in which the bearing is fully hydrodynamic and there is no metal to metal contact. They do, however, provide information on the mixed lubrication friction coefficient when squeeze film lubrication is not occurring.

In squeeze film lubrication fluid forces momentarily separate two approaching solid surfaces in oil-flooded environments, forming a hydrodynamic bearing with a much lower friction coefficient than mixed lubrication. The hydrodynamic bearing support force $F_S$ for parallel configurations is given by:

$$F_S = C\frac{\mu_l L^4 V}{h^3}$$

where $\mu_l$ is the lubricant viscosity at the operating temperature, L is the shortest flow path length from the center of the bearing area to the edge, V is the perpendicular velocity between the two surfaces, h is the separation between the surfaces, and C is a constant determined by the bearing geometry. It is believed that each time the rod alternates between compressive and tensile force, the journal oil film between the connecting rod small end 101 and eccentric bushing 102 forms a transient low friction hydrodynamic bearing. The time duration of this transient increases with oil viscosity $\mu_l$ and reduces with increased force F, resulting in variations with engine speed, load and temperature.

Transient low friction hydrodynamic bearing effects have the positive effect of facilitating eccentric rotation during rod length change, particularly during the rod length increases to raise compression wherein only relatively low inertial forces are available to provide the rotational torque. Conversely, transient low friction hydrodynamic bearing effects have the negative effect of increasing the torque load on the eccentric latch mechanism from cylinder pressure loading, particularly when maintaining maximum rod length during high compression operation.

In summary, prior art eccentric bushing variable compression connecting rods may not achieve reliable length shifts under all conditions, and have squeeze film bearing transients in the journal bearing between the connecting rod small end and eccentric bushing that are counterproductive in some operating modes. A need therefore exists for improvements that address these issues.

SUMMARY OF THE INVENTION

The present invention is directed to designs and methods for providing two-stage engine variable compression using eccentric bushings to change connecting rod length that provide reliable and consistent rod length shifts. It is further directed to providing robust mechanisms that minimize volume and weight, incorporate simple controls, and minimize changes to engines.

According to one aspect of the invention, a switchable one-way clutch mechanism such as ratchet is used as the latch that controls the eccentric rotation rather than the prior art latches that engage only at the eccentric rotation end points. This mechanism captures incremental rotation in the required direction even if the eccentric does not rotate the full travel in a given connecting rod force reversal cycle, so that the full travel may be accumulated over more than one force reversal cycle. The clutch mechanism then latches the eccentric at the eccentric rotation end point. When the clutch direction is switched, the eccentric is free to rotate in the opposite direction with the same incremental rotation capability. This incremental motion capture capability results in more reliable compression ratio shifting by eliminating the possibility of non-productive cycling. Preferably when the clutch direction is switched it maintains its original locking direction until the rod load and resulting torque on the eccentric are at a low level and in the new rotation direction. This pre-set characteristic allows the clutch direction to be switched at any point in the engine cycle, while assuring that the clutch releases only when the force direction and magnitude are favorable.

A second aspect of the invention modifies the squeeze film interface in the journal bearing between the connecting rod and the eccentric to reduce the peak cylinder loads on the eccentric latching mechanism while facilitating the inertial load driven eccentric rotation from low to high compression. This is accomplished by providing flow passages such as grooves in selected portions of the cylindrical surfaces forming the journal bearing. These flow passages are arranged to reduce the shortest oil flow path L from the center of the squeeze film bearing area to the edge. Since the squeeze bearing force $F_s$ is proportional to $1/L^4$, reductions in L provide effective means of reducing $F_s$ and minimizing squeeze film low friction transients in the oil film in the journal bearing when the applied load is compressing the oil film towards the portions of the bearing having the flow passages. In a preferred embodiment an array of multiple axial grooves are formed in the cylindrical journal bore in the connecting rod small end over the half of its circumference that carries high compressive connecting rod loads transmitted from the eccentric. This has the effect of suppressing the squeeze film bearing effect and assuring that the friction coefficient μ is the higher mixed lubrication friction coefficient and not the lower hydrodynamic coefficient, thus reducing the load on the latch during these high compressive load intervals. Transient hydrodynamic squeeze film lubrication is, however, retained during the lower force tensile load intervals, facilitating eccentric rotation.

A third aspect of the invention comprises a spring-loaded toggle that may be shifted between two stable positions in response to an engine control signal to pre-set the switchable one-way clutch mechanism. In the first stable position the spring-loaded toggle applies force to the one-way clutch mechanism such that the clutch is biased to allow eccentric rotation that increases the rod length, and in the second stable position the toggle applies force to the one-way clutch mechanism such that the clutch is biased to allow eccentric rotation that decreases the rod length. The toggle force is preferably set to a value insufficient to disengage the clutch when it is highly loaded, preventing abrupt and potentially damaging eccentric rotation and rod length change. Instead the clutch only disengages when the rod force reverses and the eccentric torque passes through zero. After disengagement in one direction, the applied toggle force biases the one-way clutch so that the eccentric rotation can only take place in the opposite direction. These characteristics allow the toggle to be shifted between the two stable positions and thereby pre-set at any point in the engine cycle, and only complete the action when the conditions are favorable. In this disclosure control cam surfaces mounted to the stationary engine structure interact with the toggle mechanism on the connecting rod to shift the toggle between the two stable positions and thereby initiate a change in rod length and compression ratio in response to an engine control signal. It is obvious, however, that other means, e.g. hydrostatic fluid interaction employing a hydraulic plunger, hydrodynamic fluid interaction employing oil nozzles, electromagnetic interactions and hybrid approaches may be used to shift the toggle in response to an engine control signal without departing from the spirit of the invention.

DESCRIPTION OF DRAWINGS

The appended claims set forth those novel features that characterize the invention. However, the invention itself, as well as further objects and advantages thereof, will best be understood by reference to the following detailed description of preferred embodiments. The accompanying drawings, where like reference characters identify like elements throughout the various figures. "Front" views are in the direction of the crankshaft axis wherein the crankshaft is rotating in the clockwise direction, and "rear" views are in the direction of the crankshaft axis wherein the crankshaft is rotating in the counterclockwise direction. The term "oil" indicates any liquid lubricant.

DETAILED DESCRIPTION OF THE INVENTION

Upon examination of the following detailed description the novel features of the present invention will become apparent to those of ordinary skill in the art or can be learned by practice of the present invention. It should be understood that the detailed description of the invention and the specific examples presented, while indicating certain embodiments of the present invention, are provided for illustration purposes only. Various changes and modifications within the spirit and scope of the invention will become apparent to those of ordinary skill in the art upon examination of the following detailed description of the invention and claims that follow.

The prior art and the invention are described with reference to four cycle internal combustion engines, but it is to be understood that the invention is applicable to other reciprocating engines, pumps and compressors that might benefit from variable compression. In the description "upper", "top", "above" and "head" refer to the direction towards the combustion chamber, and "lower" and "downward" refer to the direction towards the crankcase.

Figure 1:
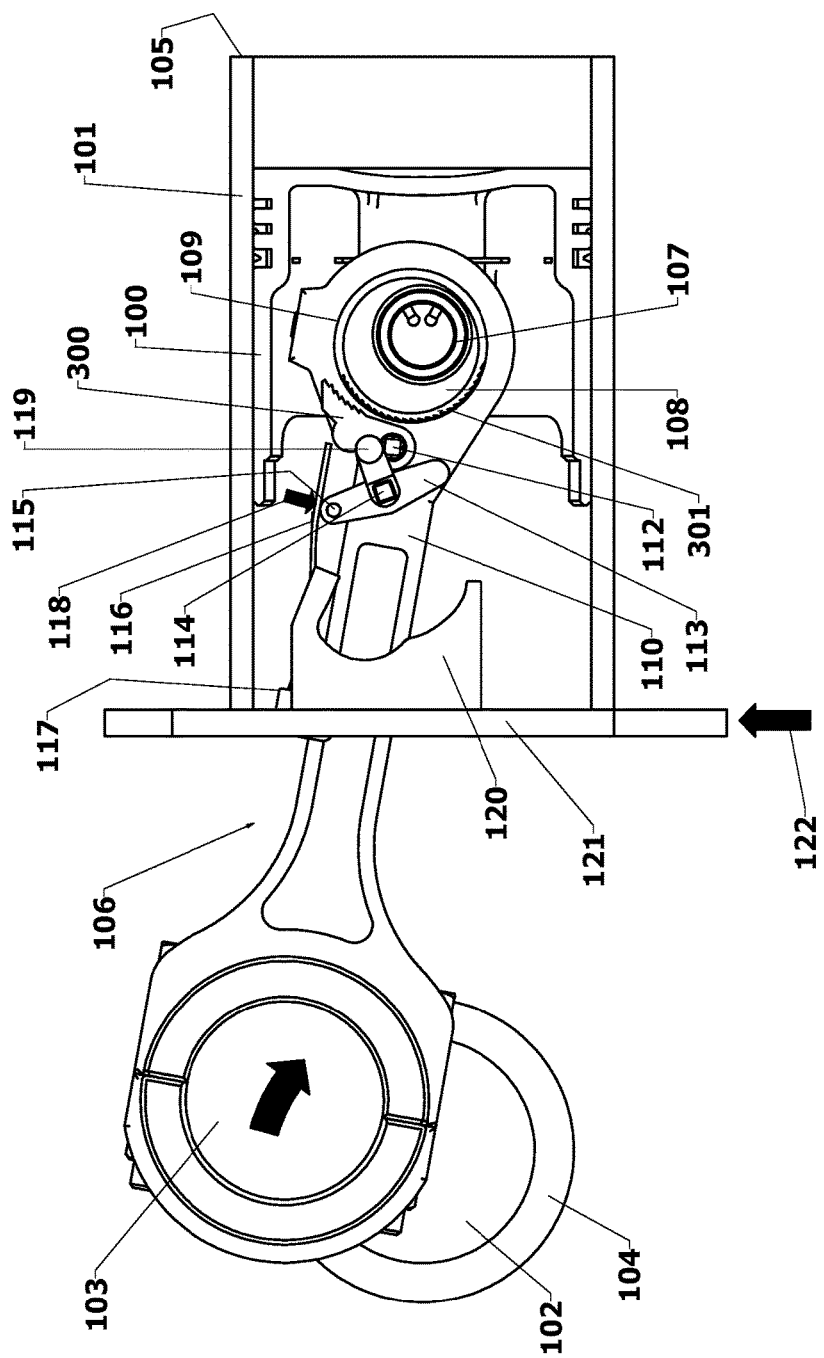
FIG. 1 is a front view of a piston, cylinder, connecting rod and crank assembly incorporating the inventive two-stage variable compression connecting rod mechanism in the high compression setting.
Figure 2:
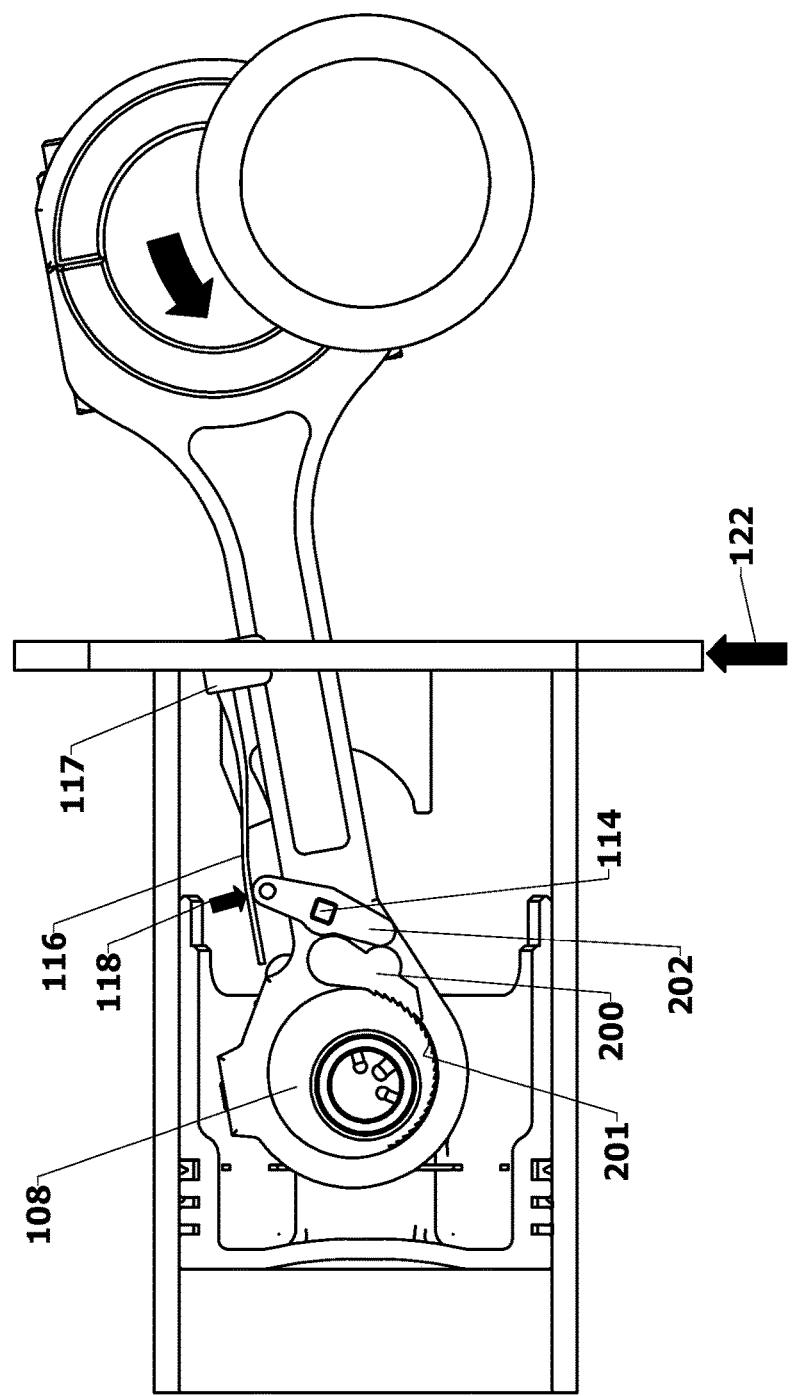
FIG. 2 is a rear view of a piston, cylinder, connecting rod and crank assembly incorporating the inventive two-stage variable compression connecting rod mechanism in the high compression setting.
Figure 3:
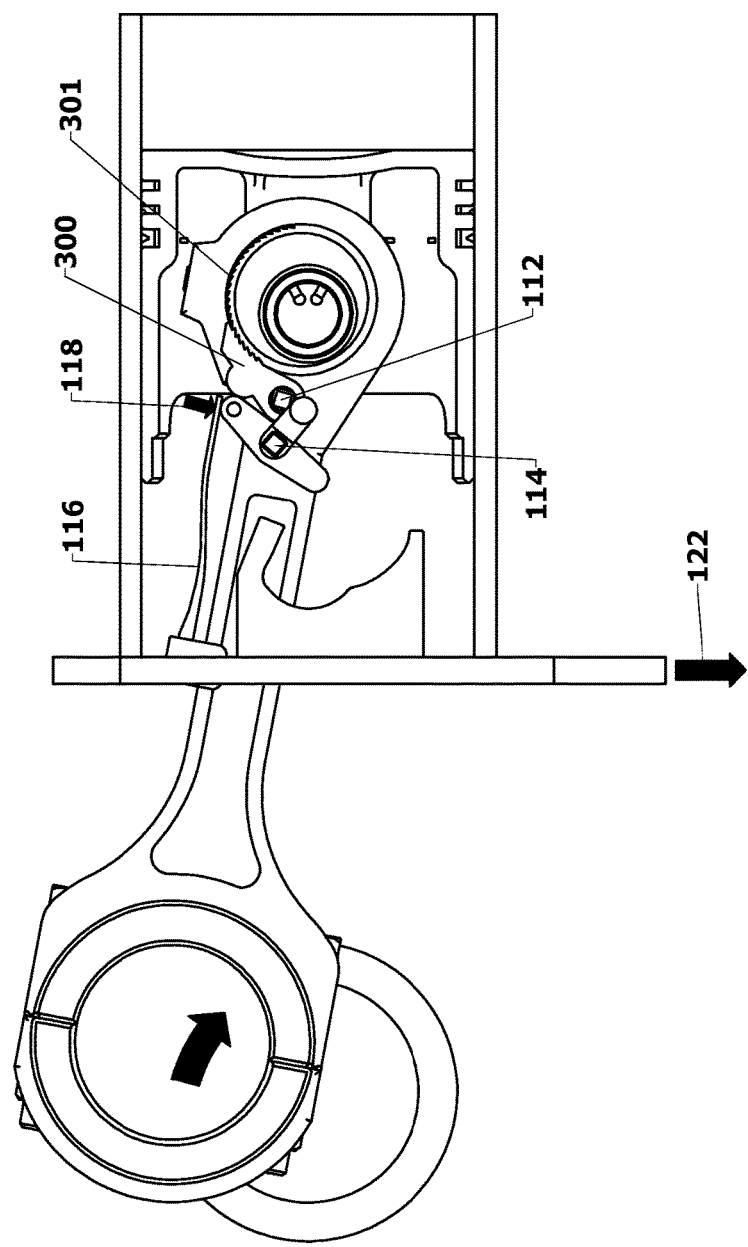
FIG. 3 is a front view of a piston, cylinder, connecting rod and crank assembly incorporating the inventive two-stage variable compression connecting rod mechanism in the low compression setting.
Figure 4:
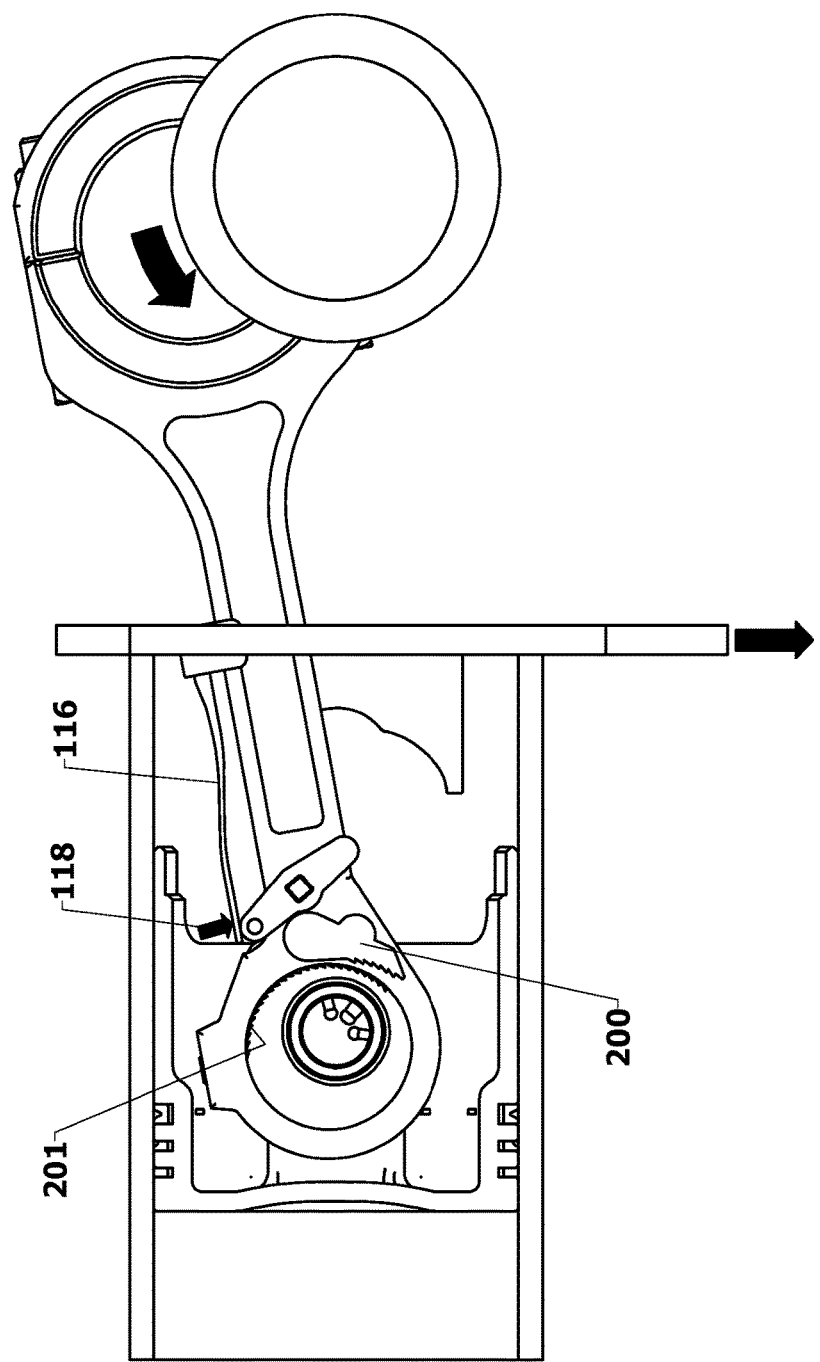
FIG. 4 is a front view of a piston, cylinder, connecting rod and crank assembly incorporating the inventive two-stage variable compression connecting rod mechanism in the low compression setting.

FIG. 1, FIG. 2, FIG. 3 and FIG. 4 show a variable compression engine assembly incorporating the two-stage variable length connecting rod of the invention. Piston 100, cylinder bore 101 and crankshaft 102 incorporating crankpin 103 are of conventional design. The crankshaft 102 rotates within journal 104, and journal 104 and the cylinder bore 101 are rigidly connected in a fixed geometric relationship by the usual crankcase and engine block structure. They cylinder head (not shown) abuts the upper end 105 of the cylinder bore 101 in a fixed sealing relationship. The two-stage variable length connecting rod assembly 106 connects the crankpin 103 and the piston wrist pin 107, and like a conventional connecting rod couples the rotary motion of crankshaft 102 to the linear oscillating motion of the piston 100 within the bore 101. The effective length of the rod 106 is the distance between the centers of the crankpin 103 and the piston pin 107, and is adjusted by rotating the eccentric 108 between two positions in a bore 109 in the upper end of the rod body 110. FIG. 1 and FIG. 2 show the rod assembly 106 in the maximum length or high compression configuration, and FIG. 3 and FIG. 4 show it in the minimum length or low compression configuration. The eccentric 108 is retained in the high compression configuration by ratchet pawl 200 engaging ratchet teeth 201 formed in the outer diameter of the eccentric as illustrated in FIG. 2. Similarly, the eccentric 108 is retained in the low compression configuration by ratchet pawl 300 engaging ratchet teeth 301 formed in the outer diameter of the eccentric as illustrated in FIG. 3. Ratchet pawls 200 and 300 are connected by a shaft 112 rotating in a journal in the rod body 110, and form an assembly that rotates as a unit.

The toggle comprises a first member 202 adjoining the rear face of rod body 110 and a second member 113 adjoining the front surface of the rod body. Toggle members 202 and 113 are connected by a shaft 114 rotating in a journal in the rod body 110, and form an assembly that rotates as a unit. A member 115, e.g. a roller, is carried between toggle members 202 and 113. The member 115 engages a beam spring 116 attached at one end by means of a mount 117 to the rod body 110. The beam spring 116 is preloaded to apply a force 118 to the member 115 such that a torque is applied to the assembly of toggle members 202 and 113 rotating about the center of shaft 114. The effect is to form a bi-stable toggle mechanism that takes a first stable position corresponding to a high compression setting as illustrated in FIG. 1 and FIG. 2, and a second stable position corresponding to a low compression setting as illustrated in FIG. 3 and FIG. 4. In the first stable position the toggle member 202 bears against ratchet pawl 200 such that it is engaged with eccentric ratchet teeth 201, while ratchet pawl 300 is disengaged from eccentric ratchet teeth 301. Similarly, in the second stable position the toggle member 113 bears against ratchet pawl 300 such that it is engaged with eccentric ratchet teeth 301, while ratchet pawl 200 is disengaged from eccentric ratchet teeth 201. In a preferred embodiment the ratchet pawls 200 and 300 and the mating eccentric ratchet teeth 201 and 301 have engagement angles such that the teeth remain engaged when the rod is highly loaded, even after the toggle is flipped and the toggle force is biased to disengage the teeth. The teeth only disengage when the rod force reverses and the eccentric torque passes through zero. After disengagement in one direction, the applied toggle force biases the pawls 200 and 300 so that the eccentric 108 rotation can take place in the opposite direction. These characteristics allow the toggle to be flipped between the two stable positions and thereby pre-set at any point in the engine cycle, and only complete the action when the conditions are favorable.

The toggle member 113 further comprises a cam follower 119 that extends in front of the rod body 110 and engages control cam 120 during a portion of the engine cycle to flip the bi-stable toggle mechanism from one stable position to the other stable position and trigger a compression ratio change. The control cam 120 is supported by a cam carrier 121 that is free to move a distance 122 in response to a compression ratio change command from the engine control module.

Figure 5:
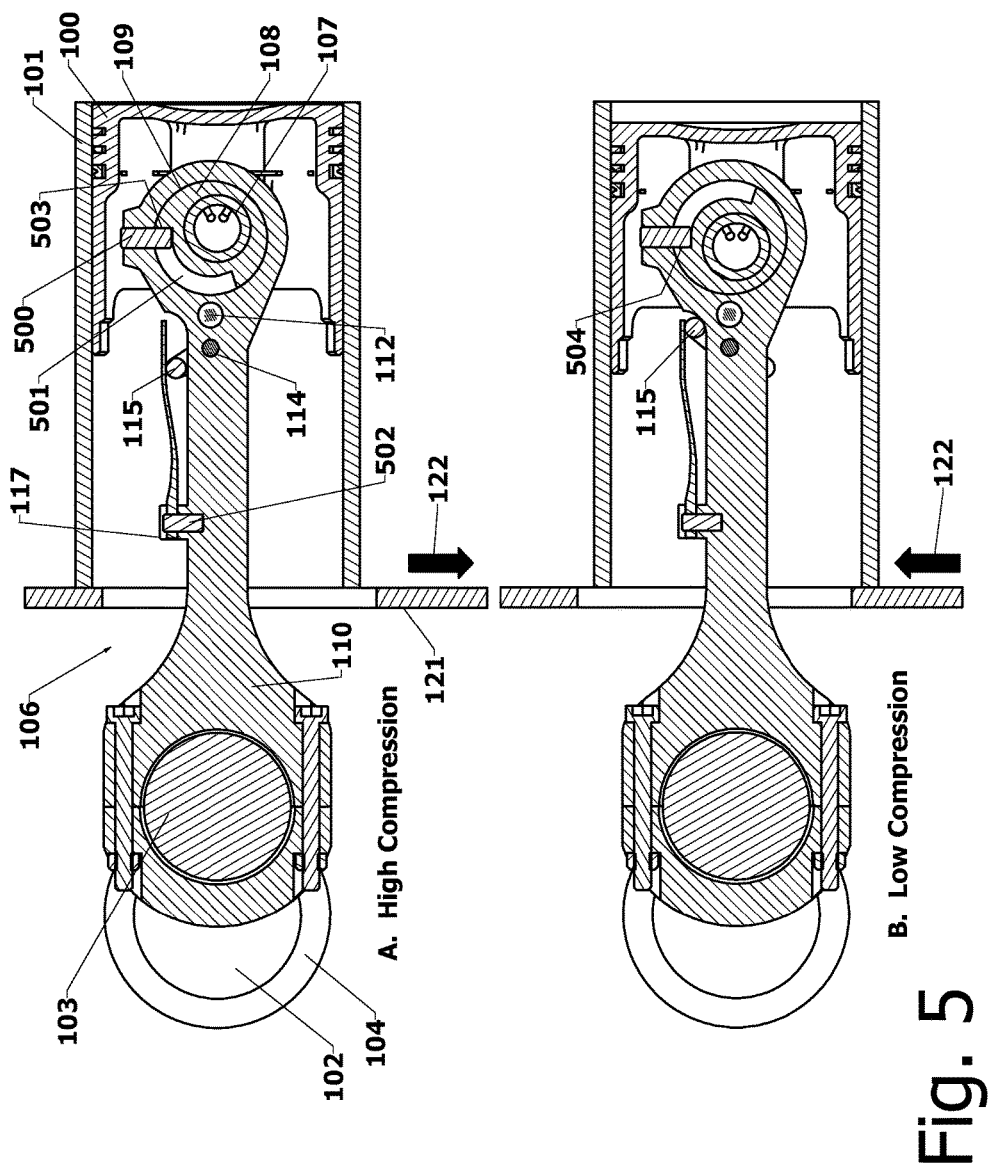
FIG. 5 contains two front sectional views of a piston, cylinder, connecting rod and crank assembly incorporating the inventive two-stage variable compression connecting rod mechanism in the low and high compression settings.

The cutaway views of FIG. 5 illustrates further details of the inventive connecting rod assembly 106 in the high and low compression settings at top dead center. Stop pin 500 disposed in stop groove 501 limits the rotation of eccentric 108. In the high compression setting stop pin 500 carries the eccentric reaction torque resulting from tensile connecting rod loads, and in the low compression setting it carries the torque resulting from compressive rod loads. In each setting the pawls (not visible in FIG. 5) carry the torques in the opposing directions. Toggle shaft 114 and pawl shaft 112 pass through journals in rod body 110, and a pin 502 secures the beam spring 116 in the spring mount 117.

Figure 6:
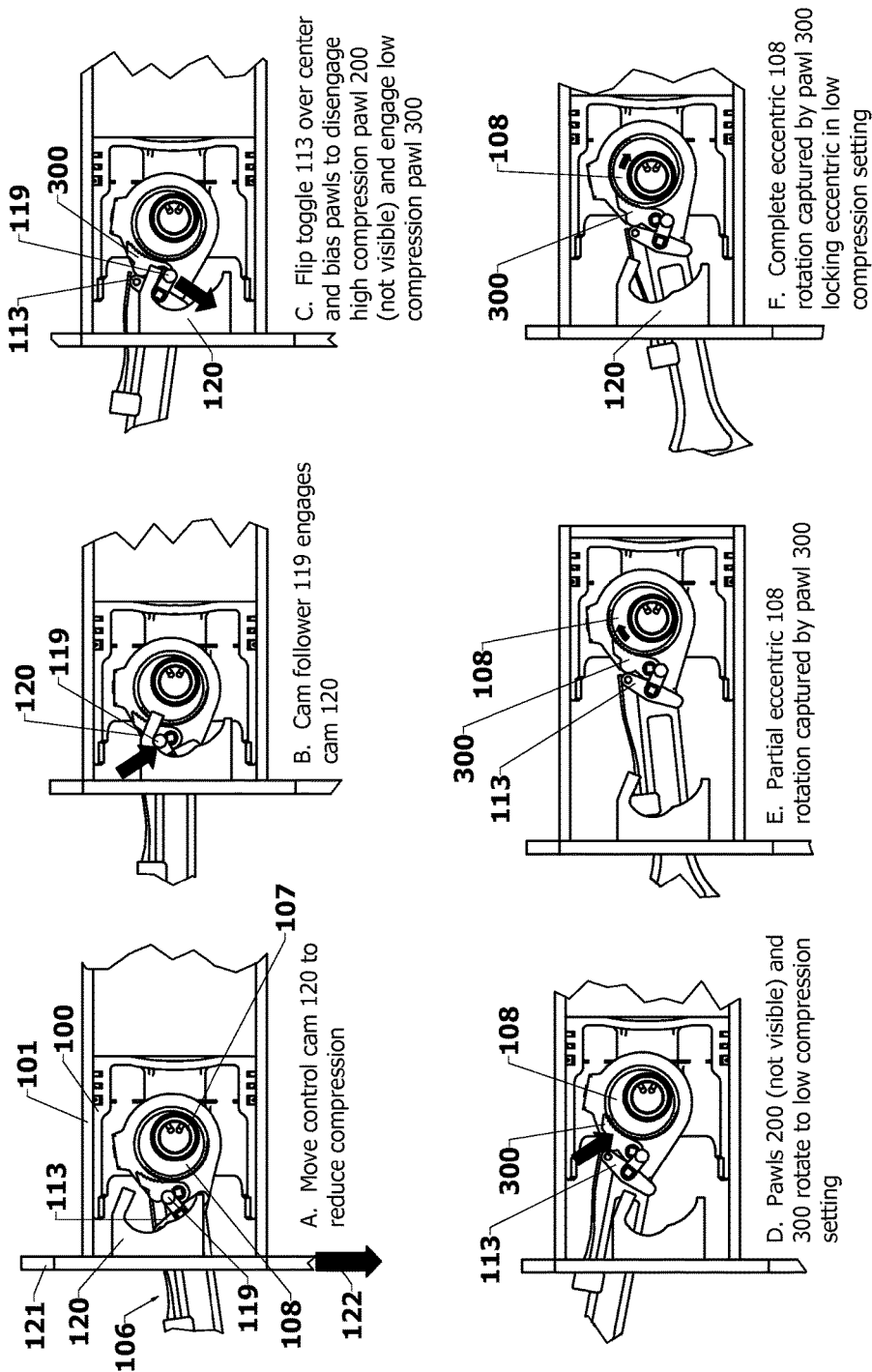
FIG. 6 contains multiple front views illustrating the transition of the inventive two-stage variable compression connecting rod mechanism from the high compression setting to the low compression setting.

FIG. 6 shows the sequence of events during a transition from the high to the low compression setting.

In FIG. 6A the control cam 120 and the control cam carrier 121 is moved a distance 122 from the high compression position to the low compression position to engage cam follower 119. This motion is initiated by the engine control module and is carried out by any of a number of known actuation means. The motion may take place any time in the engine cycle, and the cam follower engagement will take place the next time the piston 100 and the rod assembly 106 pass through bottom dead center.

FIG. 6B and FIG. 6C show the engagement of cam follower 119 with control cam 120, causing toggle 113 to flip over center. If the motion 122 is incomplete during the bottom dead center event, the toggle 113 may be partially rotated but return to its initial position rather than flip to the new position. In this case the flip will take place during a subsequent bottom dead center event after the control cam 120 has moved further. Once the toggle 113 has flipped over center, the follower 119 no longer contacts the control cam.

FIG. 6D shows the pawls 200 and 300 rotated by the toggle 113 to the new low compression setting prior to any rotation of eccentric 108. This rotation from the position shown in FIG. 6C can only take place when the rod load transitions from tension to compression and the torque load on pawl 200 reaches a low level.

FIG. 6E shows partial rotation of eccentric 108 driven by compressive load on the rod assembly 106. The teeth of pawl 300 are forced into engagement with eccentric teeth 301 by the toggle 113. This forms a one-way clutch that allows forward eccentric rotation under compressive rod assembly loads, and prevents reverse rotation under tensile loads, thereby capturing the partial rotation.

FIG. 6F shows full rotation of the eccentric 108 to the low compression setting the after one or more additional compressive load events. In this steady-state condition eccentric compressive reaction torques are carried by the stop pin 500 shown in FIG. 5 B, and the tensile reaction torques are carried by pawl 300. In this condition the rod assembly 106 functions as a conventional rod, and there is no interaction between the assembly and the control cam 120.

Figure 7:
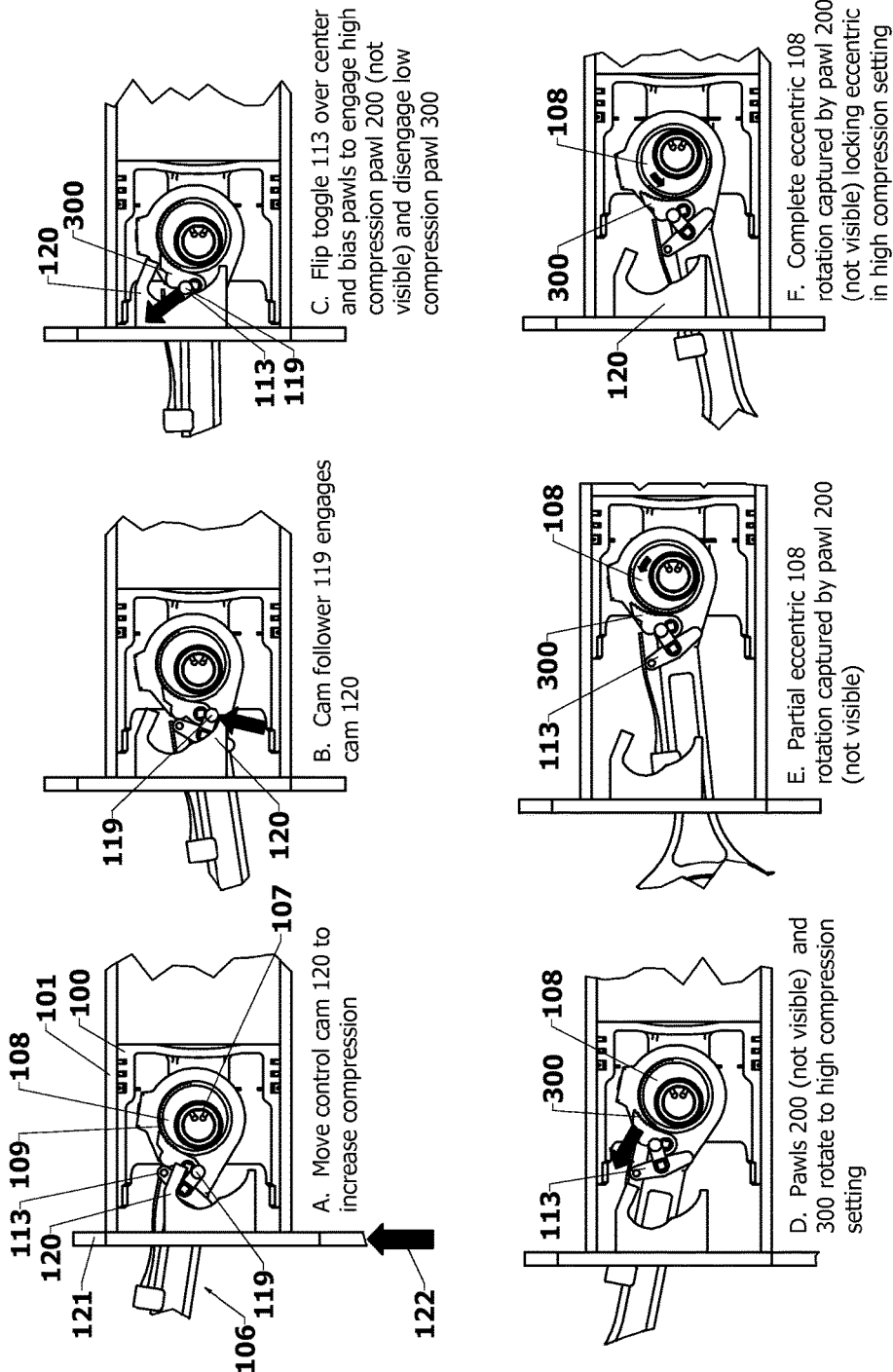
FIG. 7 contains multiple front views illustrating the transition of the inventive two-stage variable compression connecting rod mechanism from the low compression setting to the high compression setting.

FIG. 7 shows the sequence of events during a transition from the low to the high compression setting.

In FIG. 7A the control cam 120 and the control cam carrier 121 is moved a distance 122 from the low compression position back to the high compression position to engage cam follower 119. Again, this motion is initiated by the engine control module and may take place any time in the engine cycle.

FIG. 7B and FIG. 7C show the engagement of cam follower 119 with control cam 120 during a bottom dead center event, causing toggle 202 (not visible) to flip over center to the high compression setting position. If the motion 122 is incomplete during the bottom dead center event, the toggle 202 may be partially rotated but return to its initial position rather than flip to the new position. In this case the flip will take place during a subsequent bottom dead center event after the control cam 120 has moved further. Once the toggle 202 has flipped over center, the follower 119 no longer contacts the control cam.

FIG. 7D shows the pawls 200 and 300 rotated by the toggle 202 to the new high compression setting prior to any rotation of eccentric 108. This rotation from the position shown in FIG. 7C can only take place when the rod load transitions from compression to tension and the torque load on pawl 300 reaches a low level.

FIG. 7E shows partial rotation of eccentric 108 driven by tensile load on the rod assembly 106. The teeth of pawl 200 (not visible) are forced into engagement with eccentric teeth 201 by the toggle 202. This forms a one-way clutch that allows forward eccentric rotation under tensile rod assembly loads, and prevents reverse rotation under compressive loads, thereby capturing the partial rotation.

FIG. 7F shows full rotation of the eccentric 108 to the high compression setting the after one or more additional tensile load events. In this steady-state condition eccentric tensile reaction torques are carried by the stop pin 500 shown in FIG. 5A, and the compressive reaction torques are carried by pawl 200. In this condition the rod assembly 106 functions as a conventional rod, and there is no interaction between the assembly and the control cam 120.

Figure 8:
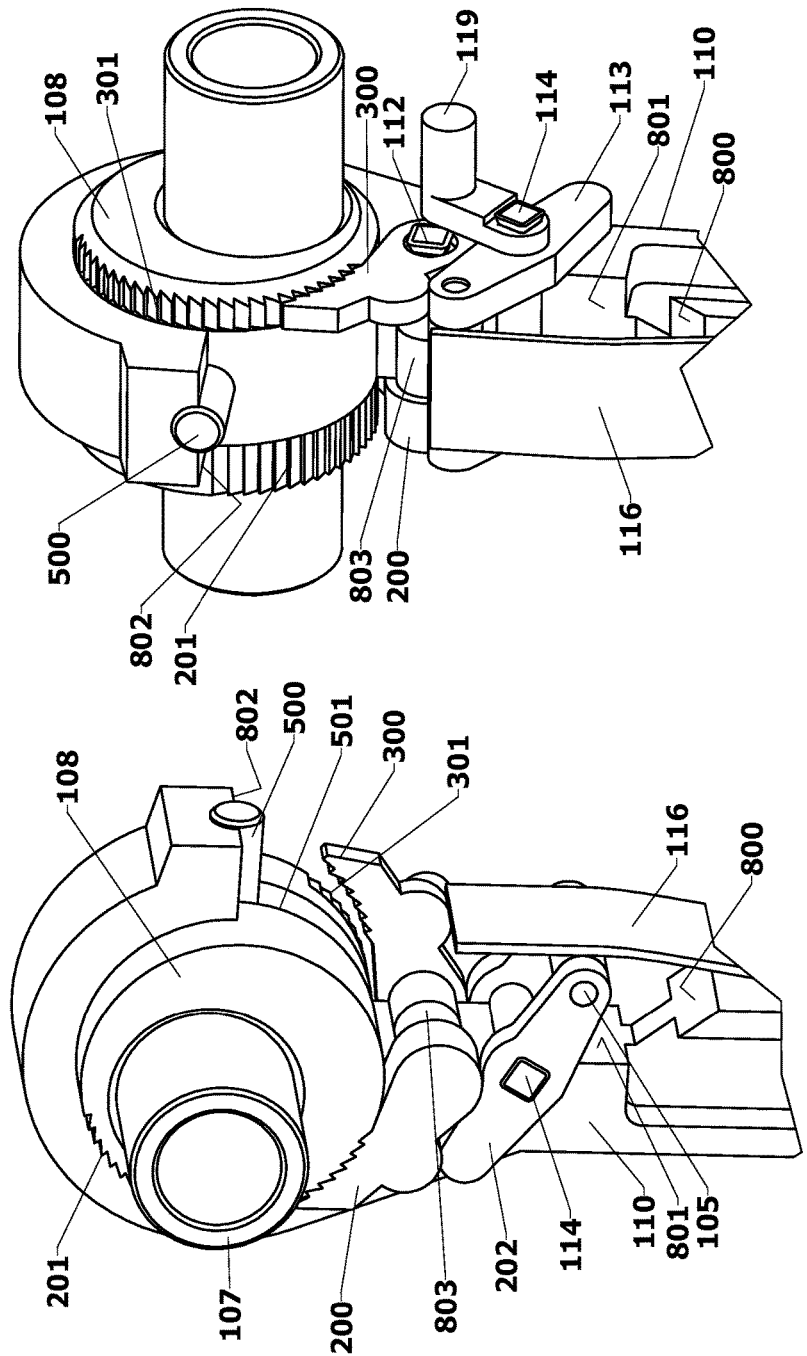
FIG. 8 provides cutaway perspective views of the eccentric, clutch and toggle mechanism of the inventive mechanism in the low and high compression settings.

FIG. 8 provides further details of a preferred embodiment of the invention. A portion of rod body 110 is cut away along faces 801, 802 and 803 to reveal otherwise hidden features.

FIG. 8A shows the high compression setting wherein pawl 200 is engaged with eccentric teeth 201 and stop pin 500 abuts the end of groove 501, locking eccentric 108 into the high compression setting. This is the steady state condition shown in FIG. 6F in which the cam follower 119 does not make contact with control cam 120, and the toggle assembly 202 and 113 is loaded by beam spring 116 to hold the pawl 200 in engagement with eccentric teeth 201. Pawl 200 and pawl 300 are rotationally connected through cylindrical member 803 passing through rod body 110 such that pawl 300 is disengaged from eccentric teeth 301.

FIG. 8B shows the low compression setting wherein pawl 300 is engaged with eccentric teeth 301 and stop pin 500 abuts the opposite end of groove 501, locking eccentric 108 into the low compression setting. This is the steady state condition shown in FIG. 7F in which the cam follower 119 does not make contact with control cam 120, and the toggle assembly 202 and 113 is loaded by beam spring 116 to hold the pawl 300 in engagement with eccentric teeth 301. The rotational connection 803 disengages pawl 200 from eccentric teeth 201.

FIG. 8 shows pawl 200 and eccentric teeth 201 to be wider than pawl 300 and eccentric teeth 301. This optional feature reflects the fact that pawl 200 and eccentric teeth 201 carry the eccentric reaction torque resulting from compressive rod loads from high compression and combustion pressures, while pawl 300 and eccentric teeth 301 carry the eccentric reaction torque resulting from the lower tensile rod loads from inertial loads.

Figure 9:
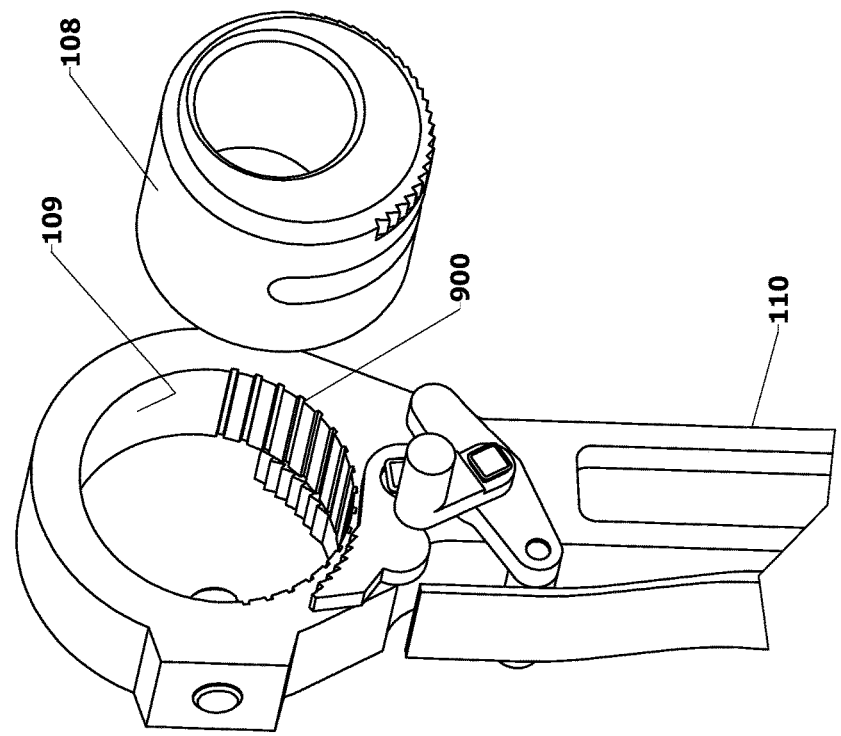
FIG. 9 is an exploded perspective view of the eccentric, clutch and toggle of the inventive mechanism, particularly illustrating a preferred embodiment comprising an array of multiple axial grooves formed in the cylindrical journal bore in the connecting rod small end.

FIG. 9 shows a set of grooves 900 in the lower portion 901 of the bore 109 in the upper end of the rod body 110 that modify the squeeze film interface in the journal bearing between the connecting rod body 110 and the eccentric 108. This aspect of the invention reduces the peak eccentric reaction torque loads on the eccentric latching mechanism during steady state high compression operation, while facilitating the inertial load driven eccentric rotation from low to high compression. The grooves 900 reduce the shortest oil flow path L from the center of the squeeze film bearing area to the edge according to the analysis presented earlier in this disclosure. Since the squeeze bearing force $F_s$ is proportional to $1/L^4$, reductions in L provide effective means of reducing $F_s$ and minimizing squeeze film low friction transients in the oil film in the journal bearing when the applied load is compressing the oil film towards the lower portions of the bearing having the flow passages. This has the effect of suppressing the squeeze film bearing effect, and assuring that the friction coefficient μ is the higher mixed lubrication friction coefficient and not the lower hydrodynamic coefficient, thus reducing the load on the eccentric latching mechanism during these high compressive load intervals. Transient hydrodynamic squeeze film lubrication is, however, retained during the lower force tensile load intervals, facilitating eccentric rotation with the relatively low peak eccentric reaction torque loads present during the transition from low to high compression. During steady state low compression operation pawl 300 carries these relatively low tensile load torques easily despite undiminished squeeze film lubrication between eccentric 108 and the upper groove-free portion of bore 109.

Figure 10:
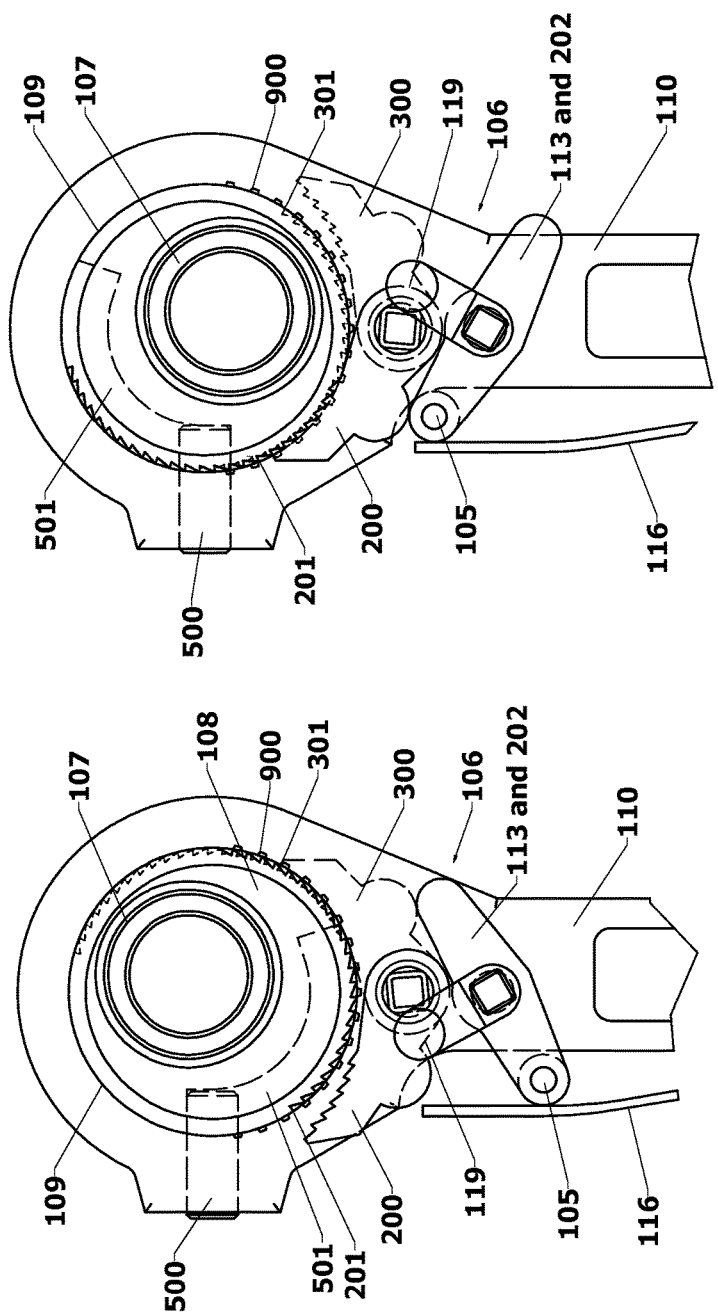
FIG. 10 contains two phantom front views providing further detail on the component positions of the inventive mechanism in the high and low compression settings.

FIGS. 10A and 10B are phantom views of the inventive rod assembly 106. In particular they show the relationships between eccentric 108, rod body 110, stop pin 500, pawls 200 and 300, toggle members 113 and 202, and beam spring 116 in each steady state locked position.

Figure 11:
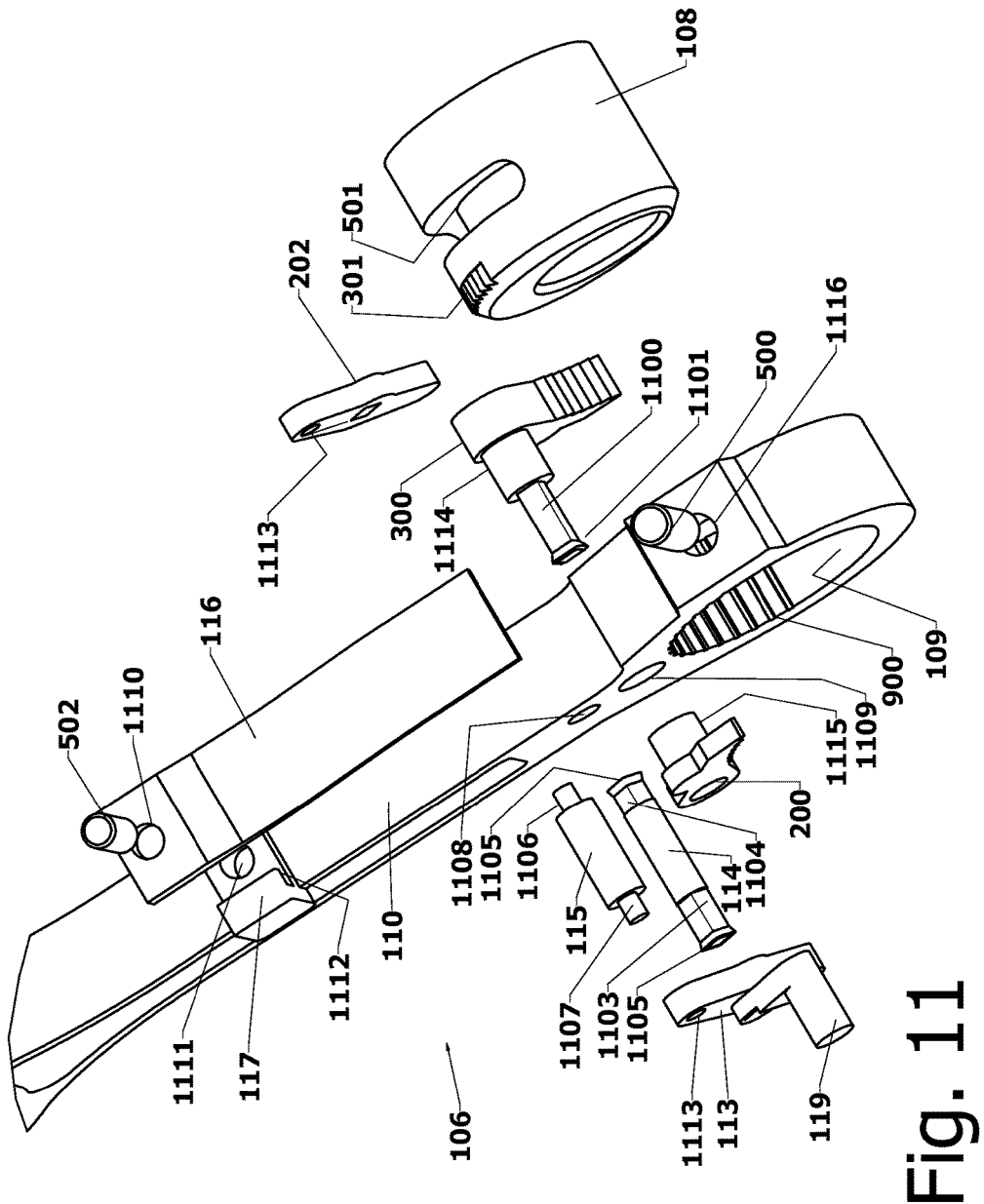
FIG. 11 is an exploded perspective view of the connecting rod associated components of the inventive mechanism.
Figure 12:
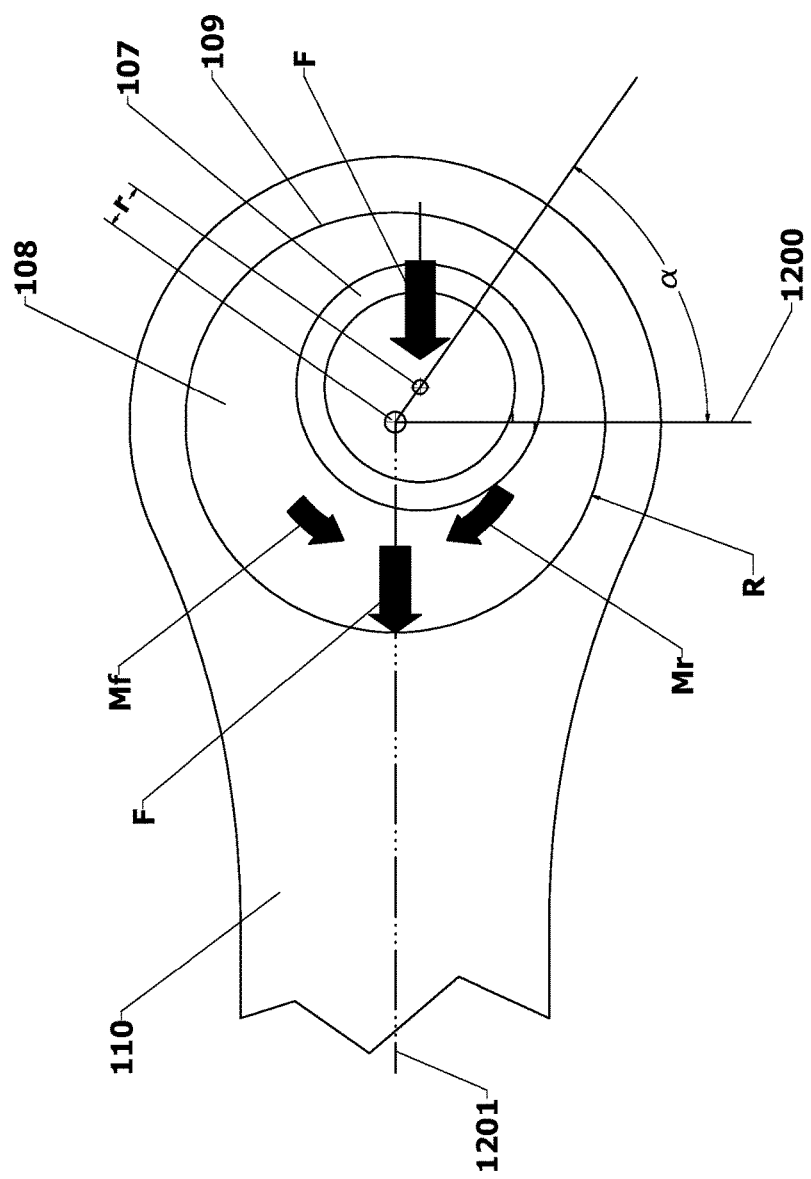
FIG. 12 illustrates the relationship between the eccentric and rod geometry, applied loads, frictional loads and resultant eccentric torques.

FIG. 11 provides further details of the components that comprise the exemplary two stage variable compression connecting rod 106. The toggle members 113 and 202 are joined by shaft 114 that incorporates square coupling ends 1103 and 1104 that transfer torque to matching holes in the toggle members. Shaft 114 rotates in bore 1108 in rod body 110, and is secured to toggle members 113 and 202 by upset heads 1105 as part of the assembly process. Pintles 1106 and 1107 at the ends of the roller member 115 rotate in holes 1113 in the toggle members. Cylindrical sections 1114 and 1115 incorporated in pawls 200 and 300 rotate within bore 1109 in rod body 110, and together with bore 1109 comprise the journal bearings that carry the load applied to the pawls by the eccentric 108. A square extension 1100 of cylinder 1114 couples with a square hole in pawl 200 to transfer torque between pawls 200 and 300 and cause them to rotate in unison. Upset head 1101 formed as part of the assembly operation joins and secures the pawls. Beam spring 116 is inserted into the slot 1112 of spring mount 117 and secured by pin 502 pressed into hole 1110 in the beam spring and 1111 in the rod body 110. Eccentric 108 is secured in bore 109 of the rod body 110 by pressing stop pin 500 into hole 1116 such that it extends into stop groove 501.

FIG. 1 through FIG. 11 and the accompanying description are primarily intended to illustrate the conceptual features of the invention, and it will be obvious to those skilled in the art that a number of equivalent mechanism details and construction methods can be used to implement the concept. The mechanism details and construction methods, however, are depicted with configurations and proportions adapted to practical internal combustion engines. The basic piston and connecting rod geometry are based on typical modern components in a high speed spark ignition engine with 75 millimeter bore diameter and 65 millimeter stroke. The components added and component modifications needed to realize the two-stage adjustable connecting rod fit within the available space and have proportions consistent with load carrying and dynamic response requirements:

The rod length change is 4 millimeters, sufficient to vary the compression between 8:1 and 16:1;

The beam spring orientation parallel to the rod reduces inertial effects on the spring load transmitted to the toggle mechanism;

The control cam and carrier fit in available space;

The beam spring is sized to apply about 100 Newtons to the toggle mechanism, which is sufficient to provide calculated toggle and pawl transitions on the order of a few milliseconds, The toggle and pawl assemblies are approximately balanced about their rotational axes to minimize response to inertial forces; and The pawls, stop pin and eccentric dimensions are selected to withstand the expected mechanical loads.

The invention claimed is:

1. A two-stage variable length connecting rod assembly for internal combustion engines and similar reciprocating piston machines, wherein an eccentric bushing rotates within the connecting rod body small end and incorporates the piston wrist pin journal with the effect that rotation of the eccentric bushing relative to the connecting rod body increases or decreases the rod effective connecting rod assembly length with corresponding increases or decreases the engine compression ratio, wherein;
   eccentric bushing rotational motion is limited by mechanical end stop means such that the first end stop position corresponds to a high compression setting and the second end stop position corresponds to the low compression setting;
   the eccentric bushing is rotationally oriented relative to the connecting rod by the mechanical end stops such that transient compressive loads on the connecting rod assembly create torque to rotate the eccentric bushing toward the low compression setting and transient tensile loads create torque to rotate the eccentric bushing toward the high compression setting; and
   a selectively switchable bidirectional one-way mechanical clutch with at least one intermediate rotational holding position in each rotation direction permits incremental forward eccentric bushing rotation in the selected direction and holds against backward rotation in at least one intermediate positions and when the eccentric progresses to the end stop.

2. The two-stage variable length connecting rod assembly of claim 1 further comprising a bi-stable spring and toggle mechanism such that in a first stable position the toggle spring force provides a setting bias to the selectively switchable bidirectional one-way mechanical clutch causing the clutch to rotate in a first rotation direction, and in a second stable position the toggle spring force provides a setting bias to the selectively switchable bidirectional one-way mechanical clutch causing the clutch to rotate in a second rotation direction.

3. The two-stage variable length connecting rod assembly of claim 2 wherein the switchable bidirectional one-way mechanical clutch parameters are chosen such that the toggle spring force is only sufficient to switch the clutch direction when the clutch is under low rotational torque load.

4. The two-stage variable length connecting rod assembly of claim 2 wherein the bi-stable spring and toggle mechanism traveling with the moving rod assembly is switched from a first stable position to a second stable position by means of a force interaction with a substantially stationary control mechanism attached to the engine structure.

5. The two-stage variable length connecting rod assembly of claim 4 wherein the stationary control mechanism attached to the engine structure comprises cam surfaces that may be shifted between two positions in response to demand for a change in compression ratio such that a follower incorporated in the toggle mechanism contacts the cam surfaces and switches the bi-stable spring and toggle mechanism from a first stable position to a second stable position.

6. A variable length connecting rod assembly for internal combustion engines and similar reciprocating piston machines, wherein an eccentric bushing rotates within the connecting rod body small end and incorporates the piston wrist pin journal with the effect that rotation of the eccentric bushing relative to the connecting rod body increases or decreases the rod effective connecting rod assembly length with corresponding increases or decreases the engine compression ratio, wherein the squeeze film hydrodynamic lubrication action in the journal bearing interface between the connecting rod body is modified by means of flow passages venting at least a selected region of the journal bearing interface, such that the hydrodynamic bearing effect in the selected region is reduced and the friction coefficient is increased.

7. The variable length connecting rod assembly of claim 6 wherein the flow passages comprise one or more grooves from the center to the edges of the selected region of the journal bearing interface, and wherein the grooves may be formed in the eccentric bushing, the connecting rod body, or both.

8. The variable length connecting rod assembly of claim 6 wherein the selected area comprises the lower portion of the journal bearing interface in the connecting rod body; wherein
   the selected area carries high loads from the compression and power strokes, and the friction coefficient between the eccentric bushing and the connecting rod body is increased to reduce torque loading of the eccentric bushing; and
   the non-selected area that comprises the upper portion of the journal bearing interface carries low loads from the exhaust and inlet strokes and retains hydrodynamic squeeze film lubrication that reduces the friction coefficient and facilitates eccentric rotation to the high compression setting.

* * * * *